US009482150B2

(12) United States Patent
Neunteufl et al.

(10) Patent No.: US 9,482,150 B2
(45) Date of Patent: Nov. 1, 2016

(54) METHOD FOR CONTROLLING A HEAT RECOVERY DEVICE IN AN INTERNAL COMBUSTION ENGINE

(75) Inventors: Klemens Neunteufl, Graz (AT); Helmut Theissl, Hart-Purgstall (AT); Philip Mark Stevenson, Höf-Präbach (AT)

(73) Assignee: AVL LIST GMBH, Graz (AT)

( * ) Notice: Subject to any disclaimer, the term of this patent is extended or adjusted under 35 U.S.C. 154(b) by 194 days.

(21) Appl. No.: 14/232,745

(22) PCT Filed: Jun. 28, 2012

(86) PCT No.: PCT/EP2012/062574
§ 371 (c)(1),
(2), (4) Date: Feb. 28, 2014

(87) PCT Pub. No.: WO2013/007530
PCT Pub. Date: Jan. 17, 2013

(65) Prior Publication Data
US 2014/0202134 A1 Jul. 24, 2014

(30) Foreign Application Priority Data

Jul. 14, 2011 (AT) .................................. 1034/2011

(51) Int. Cl.
*F02M 25/07* (2006.01)
*F02B 43/04* (2006.01)
(Continued)

(52) U.S. Cl.
CPC ............. *F02B 43/04* (2013.01); *F01K 23/065* (2013.01); *F01K 23/101* (2013.01); *F01K 25/08* (2013.01); *F02G 5/02* (2013.01); *Y02T 10/166* (2013.01)

(58) Field of Classification Search
CPC ...... F02B 43/04; F01K 25/08; F01K 23/065; F01K 23/101; F02G 5/02; F02M 25/0726; F02M 25/0731; F02M 25/0737; F02M 25/0738; F02M 25/0754; F02M 31/08; F02M 31/083
USPC ........................ 123/568.12; 701/108; 60/320
See application file for complete search history.

(56) References Cited

U.S. PATENT DOCUMENTS 6,810,668 B2 * 11/2004 Nagatani ............... F01K 23/101
60/615
7,007,473 B2 * 3/2006 Nagatani ............... F01K 23/065
60/615

(Continued)

FOREIGN PATENT DOCUMENTS

DE 10 2008 057202 A1 5/2010
EP 1 323 990 A1 7/2003
(Continued)

*Primary Examiner* — Hai Huynh
(74) *Attorney, Agent, or Firm* — Jordan IP Law, LLC; Todd A. Vaughn

(57) ABSTRACT

A method for controlling a heat recovery device in an internal combustion engine, in particular, for a motor vehicle. The heat recovery device is provided with a circuit for a working medium having an evaporator of an expansion machine that is arranged in an exhaust gas flow path of the internal combustion engine, a condensor, an expansion tank, and a feed pump. The working temperature of the working medium is controlled by varying the mass flow of the working fluid as a function of at least one operating parameter. A setpoint value of the working medium mass flow of an exhaust gas flow path of an exhaust gas tract and/or an exhaust gas recirculation line is calculated on the basis of a base setpoint value for the working medium mass flow. The base setpoint value for the working medium mass flow is at least a function of the exhaust gas temperature, preferably upstream of the evaporator, and of the exhaust gas mass flow in the exhaust gas flow path.

14 Claims, 8 Drawing Sheets

(51) Int. Cl.
*F01K 23/06* (2006.01)
*F01K 23/10* (2006.01)
*F01K 25/08* (2006.01)
*F02G 5/02* (2006.01)

(56) References Cited

U.S. PATENT DOCUMENTS 8,601,813 B2 * 12/2013 Shutty ............... F02D 41/0072
60/605.2
2005/0247056 A1 11/2005 Cogswell et al.
2006/0086091 A1 * 4/2006 Sato ..................... F01K 13/02
60/670
2006/0254276 A1 11/2006 Sato et al.
2010/0287920 A1 11/2010 Duparchy
2012/0060502 A1 * 3/2012 Gartner ............... F01K 23/065
60/670

FOREIGN PATENT DOCUMENTS

EP 1 536 104 A1 6/2005
WO 2011/128360 A1 10/2011

* cited by examiner

METHOD FOR CONTROLLING A HEAT RECOVERY DEVICE IN AN INTERNAL COMBUSTION ENGINE

CROSS-REFERENCE TO RELATED APPLICATIONS

The present application is a National Stage application of PCT International Application No. PCT/EP2012/062574 (filed on Jun. 28, 2012), under 35 U.S.C. §371, which claims priority to Austrian Patent Application No. A 1034/2011 (filed on Jul. 14, 2011), which are each hereby incorporated by reference in their respective entireties.

TECHNICAL FIELD

Embodiments relate to a method for controlling a heat recovery device in an internal combustion engine, in particular, for a motor vehicle. The heat recovery device is provided with a circuit for a working medium having an evaporator of an expansion machine that is arranged in an exhaust gas flow path of the internal combustion engine, a condensor, an expansion tank, and a feed pump. The working temperature of the working medium is controlled by varying the mass flow of the working fluid as a function of at least one operating parameter. A setpoint value of the working medium mass flow of an exhaust gas flow path of an exhaust gas tract and/or an exhaust gas recirculation line is calculated on the basis of a base setpoint value for the working medium mass flow. The base setpoint value for the working medium mass flow is at least a function of the exhaust gas temperature, preferably upstream of the evaporator, and of the exhaust gas mass flow in the exhaust gas flow path.

BACKGROUND

It is known for the thermal energy contained in the exhaust system and/or exhaust recirculation system (EGR system) of an internal combustion engine to be converted into mechanical energy.

German Patent Publication No. DE 10 2009 020 615 A1 discloses an apparatus for utilising exhaust gas heat in a motor vehicle with a circuit utilising exhaust gas heat where the working temperature of a working fluid of the circuit utilising the exhaust gas heat is regulated. In this case, the working temperature of a mass flow of the working fluid flowing through the heat exchanger of the circuit utilising the exhaust gas heat is adjusted in such a manner that the maximum permissible working temperature of the working fluid is not exceeded.

European Patent Publication No. EP 2 249 017 A discloses a similar facility for utilising waste heat with an evaporator for absorbing waste heat from an internal combustion engine where the flow rate of the working fluid is regulated in such a manner that the working fluid that is vaporised in the evaporator reaches a heater arranged in the exhaust gas flow in a superheated state when the working fluid enters the evaporator at or below a specified flow rate at which the working fluid is able to absorb a specified maximum amount of heat. The flow rate of the working fluid is controlled in such a manner that above the specified flow rate the working fluid floods the evaporator and is vaporised in the heater and then reaches a superheated state.

European Patent Publication No. EP 1 431 523 A1 discloses a temperature control facility for an evaporator, with the vapour generated by using the exhaust gas heat of an internal combustion engine. The working temperature of a working medium is controlled by altering the mass flow of the working fluid as a function of at least one operating parameter. The publication describes a classic control structure consisting of a feed forward control system (F/F feed forward correction) plus control device (F/B feed back correction). The F/F correction is calculated, but not corrected, as a function of the exhaust gas mass flow and the exhaust gas temperature. F/F correction is based on the generation of the difference between the setpoint and the actual vapour temperature.

Other facilities for utilising exhaust gas heat are known from the Japanese Patent Publication No. JP 2008 231 980 A and Japanese Patent Publication No. JP 58 023 210 A.

SUMMARY

The object of the invention is to develop a regulated utilisation of waste heat.

In accordance with embodiments, this is achieved by calculating a setpoint value of the working medium mass flow of an exhaust gas flow path of an exhaust gas tract and/or an exhaust gas recirculation line on the basis of a base setpoint value for the working medium mass flow. The base setpoint value for the working medium mass flow is at least a function of the exhaust gas temperature, preferably upstream of the evaporator, and of the exhaust gas mass flow in the exhaust gas flow path.

In order to account for the effects of superheating the working medium, provision can be made for the addition of an overheating correction value to the base setpoint value of the working medium mass flow. The overheating correction value can be derived from a temperature difference on the exhaust gas side. This can prevent the thermal destruction of the evaporator from overheating.

In order to account for saturation influences it is advantageous if a saturation correction value is added to the base setpoint value of the working medium mass flow. The saturation correction value is derived from a saturation temperature dependent upon the working medium pressure. Saturation correction prevents the working medium from entering into water vapour states at the entrance to the expansion machine. This prevents the mechanical destruction of the expansion machine.

The exhaust gas mass flow in the exhaust gas tract can be calculated from the exhaust gas lambda and fuel mass quantities using a model. It is preferable if the EGR mass flow in the exhaust gas recirculation line is calculated using a model from the values for the motor speed, motor torque, fuel mass, exhaust gas air ratio, absolute charging pressure, charge air temperature and admission efficiency.

In this way, it is possible to dispense with complex exhaust gas mass flow sensors.

In a further embodiment of the method in accordance with embodiments, provision can be made for the evaporator to calculate the actual working medium mass flow from values for the actual valve position, pressure upstream and downstream from the control valve of the evaporator and flow coefficients of the control valve by using a model. In this way, it is possible to dispense with complex mass flow sensors for the working medium.

Ultimately, controller deviations for the mass flows in the exhaust gas flow path can be generated from the setpoint values and actual values for the working medium flow and fed to a controller, for example a PID controller.

DRAWINGS

Embodiments will be explained below by reference to the drawings, wherein.

DESCRIPTION

Figure 1:
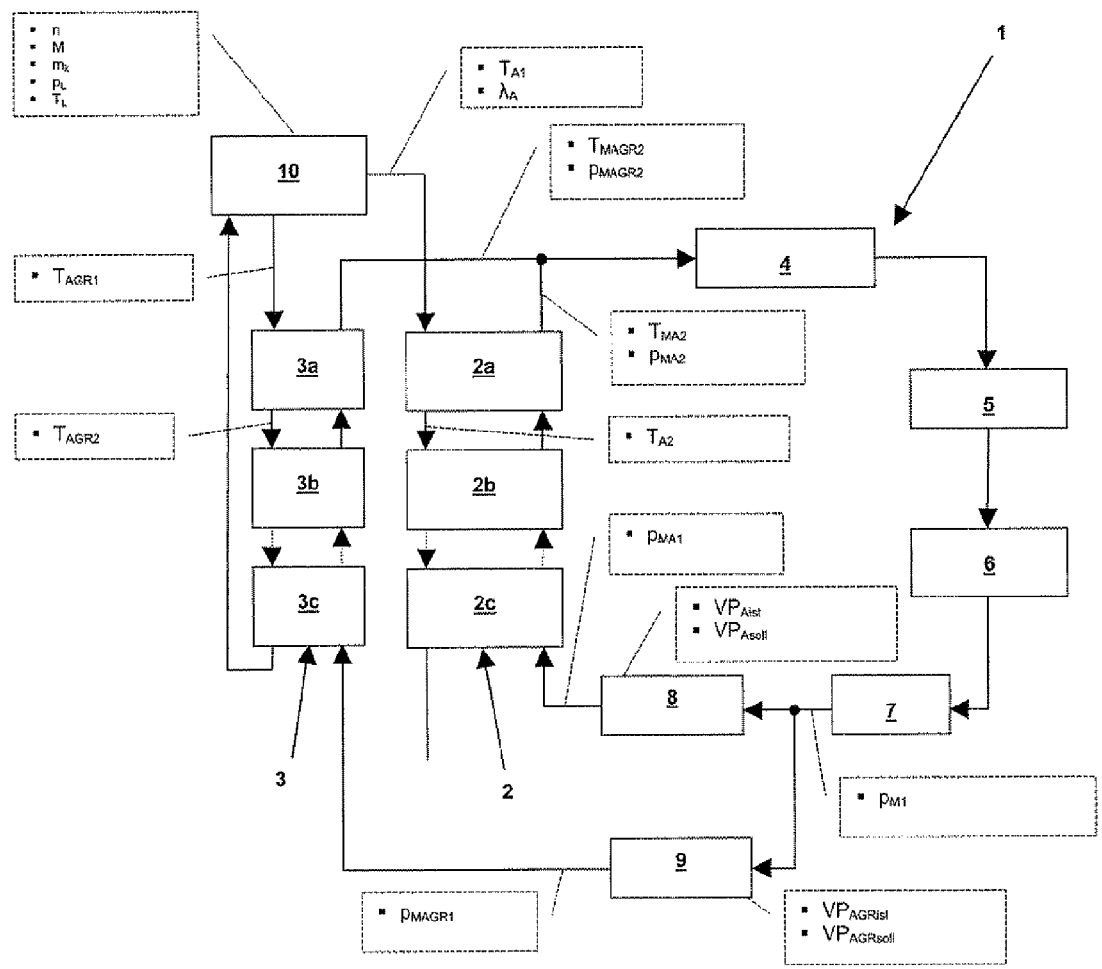
FIG. 1 illustrates the diagram of the heat recovery device in accordance with embodiments.

The heat recovery device 1 for an internal combustion engine 10 in accordance with embodiments has as its main components an exhaust gas evaporator 2 and/or EGR evaporator 3, expansion machine 4, condensor 5, expansion tank 6, feed pump 7, control valves 8, 9 with position feedback as well as temperature sensors and pressure sensors not illustrated.

In at least one evaporator (exhaust gas and/or EGR evaporator 2, 3) a working medium (for instance, water and/or ethanol) is vaporised with the aid of the thermal energy contained in the exhaust gas mass flow m'A and/or EGR mass flow m'EGR. The exhaust gas and/or EGR evaporator 2, 3 each includes at least two blocks, 2a, 2b, 2c, ... and 3a, 3b, 3c, ....

The vapour generated is fed into an expansion machine 4 (for instance, a reciprocating internal combustion engine) and converted into mechanical power. Finally, the working medium is cooled in a condensor 5 and fed to an expansion tank 6. The working medium is removed from the expansion tank 6 by at least one feed pump 7 and fed to the exhaust gas evaporator 2 and/or EGR evaporator 3 again via the control valves 8, 9 (vapour circuit process).

An infinitely variable control valve 8, 9 (e.g. an electrically actuated needle valve) is employed ahead of each evaporator 2, 3 to control the heat recovery device 1. The mass flow is altered by the control valve 8, 9 by means of the valve opening cross section and the pressure of the working medium upstream and downstream from the control valve 8, 9. Furthermore, certain system states (pressures, temperatures and valve opening such as illustrated in FIG. 1) are recorded with measuring technology and made available to the control system as actual values.

Figure 2:
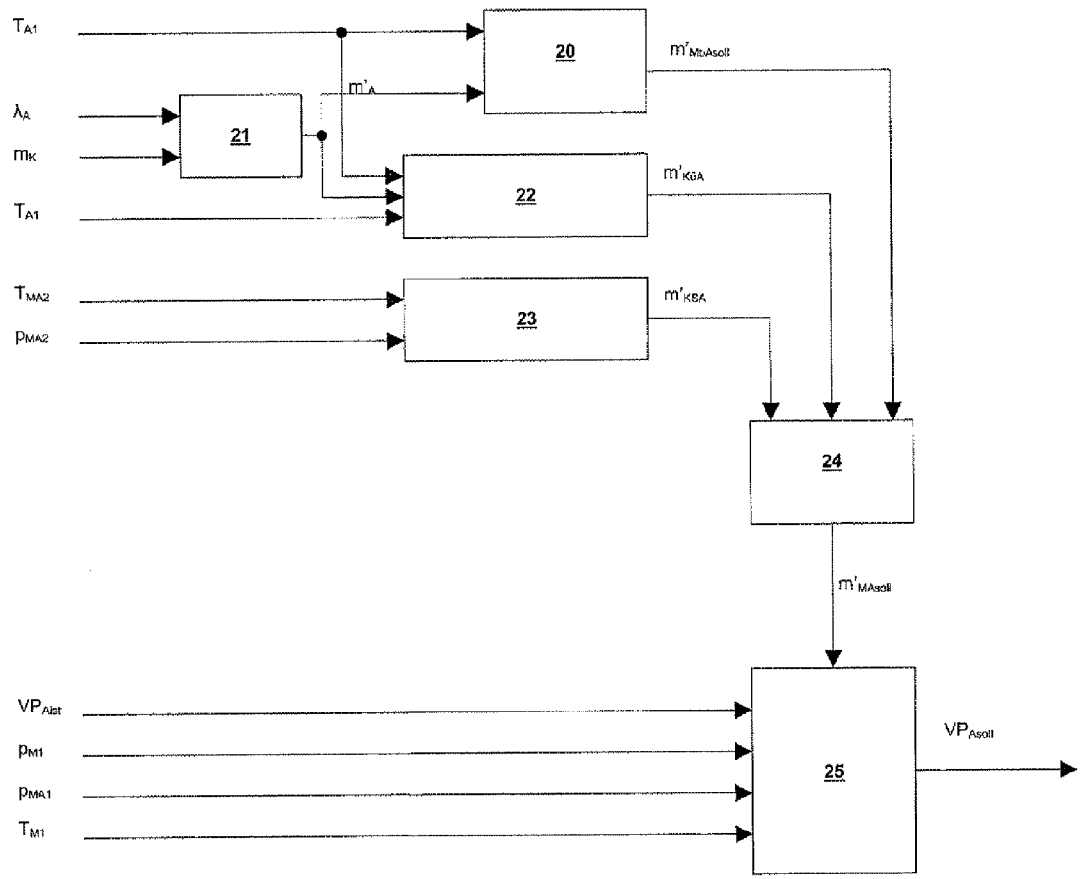
FIG. 2 illustrates a control system for the working medium involving the exhaust gas evaporator.
Figure 8:
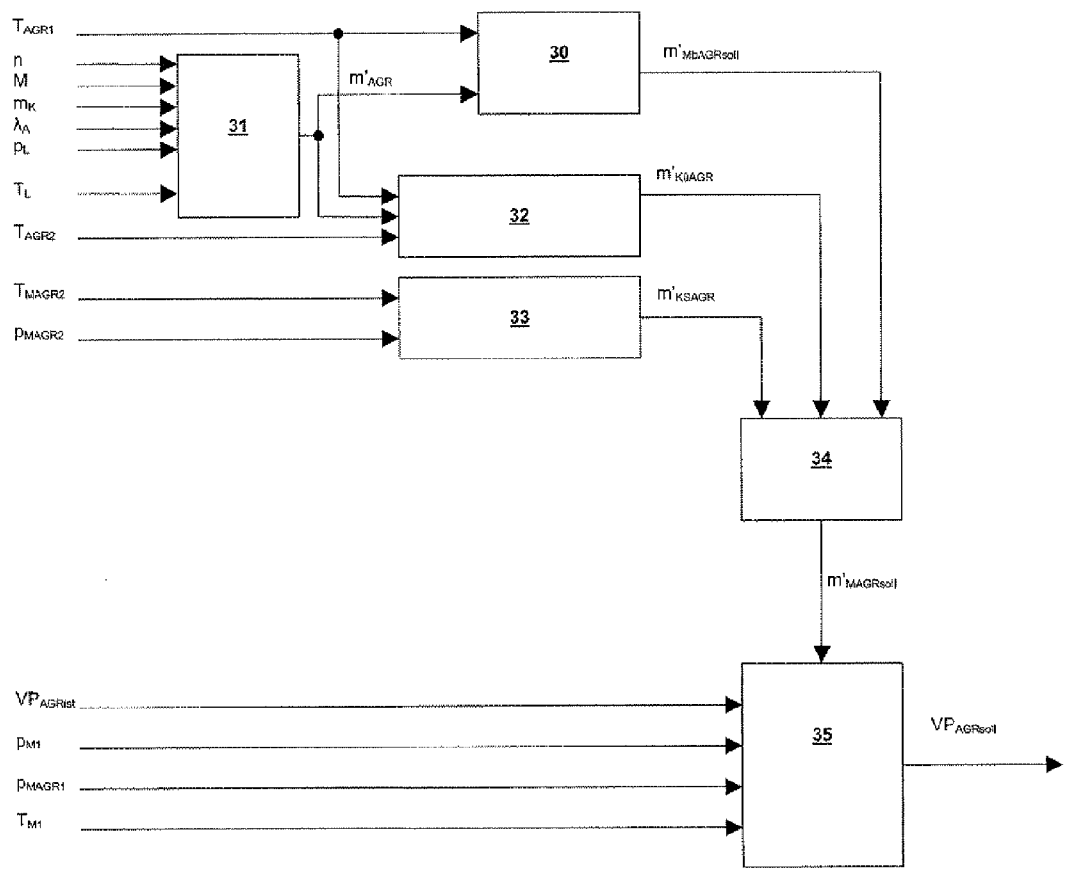
FIG. 8 illustrates a control system for the working medium involving the EGR evaporator.

The entire controller system for the exhaust gas evaporator 2 is illustrated in FIG. 2 and that for the EGR evaporator 3 in FIG. 8.

Figure 3:
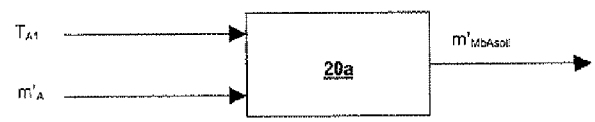
FIG. 3 illustrates the calculation of the base setpoint value of the working medium flow involving the exhaust gas evaporator.
Figure 17:
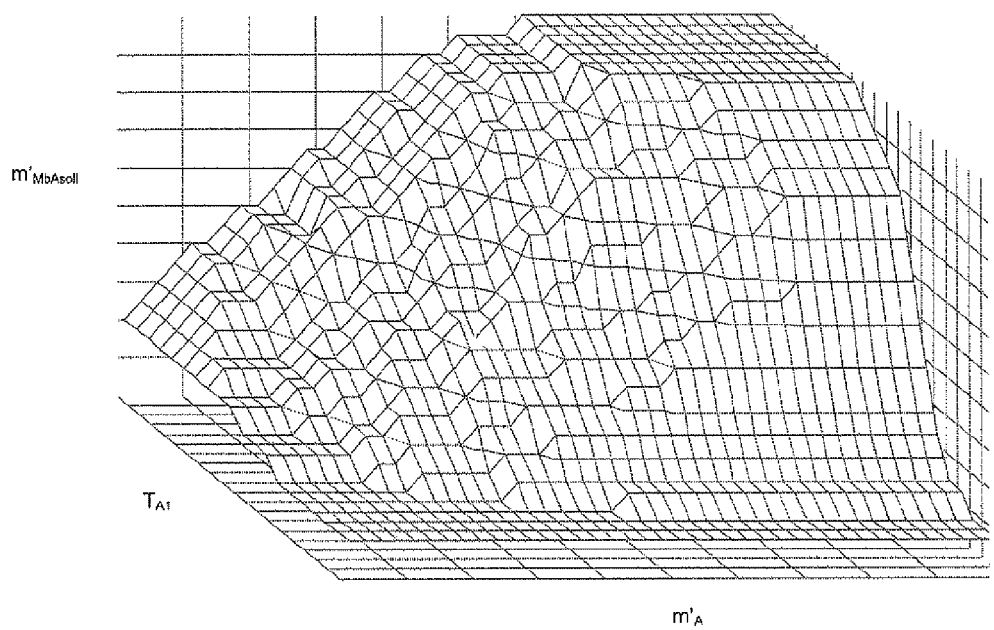
FIG. 17 illustrates a characteristic map for the base setpoint value for the working medium mass flow using the example of the exhaust gas evaporator.

In the method employed, Step 20 and 30 respectively involve the exhaust gas evaporator 2 and the EGR evaporator 3 each calculating a base setpoint value m'MbAsoll, m'MbAGRsoll for the working medium. This base setpoint value m'MbAsoll is calculated for the exhaust gas evaporator 2 as a function of the exhaust gas mass flow m'A and the exhaust gas temperature TA1 at the exhaust gas evaporator inlet. A characteristic map 20a is used for this purpose in the embodiment illustrated as an example (FIGS. 3 and 17). The exhaust gas mass flow m'A used is derived in Step 21 from the exhaust gas lambda λA and fuel mass mK values.

$$m'_A = m_K \cdot \left(1 + \frac{1}{f_S \cdot \lambda_A}\right)$$

Figure 9:
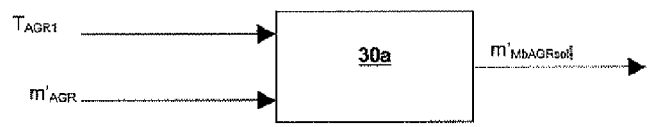
FIG. 9 illustrates the calculation of the base setpoint value of the working medium mass flow involving the EGR evaporator.

The base setpoint value m'MbAGRsoll for the EGR evaporator 3 is calculated as a function of the EGR mass flow m'AGR and the gas temperature TAGR1 at the EGR evaporator inlet. A characteristic map 30a is used for this purpose in the embodiment illustrated (FIG. 9). The EGR mass flow m'AGR used is calculated using a model in Step 31 from the values motor speed n, motor torque M, fuel mass mK, exhaust gas lambda λA, absolute charging pressure pL, and charge air temperature TL, and the admission efficiency ηF. The admission efficiency ηF is calculated as a function of the motor speed n and motor torque M (stored for example in a characteristic map).

$$\rho_{SR} = \frac{p_L}{T_L \cdot R_{SR}}$$

$$L_{SR} = \frac{m_K \cdot \lambda_A \cdot f_S \cdot 2}{\rho_{SR} \cdot n \cdot V_H}$$

$$\eta_F = f(n, M)$$

$$r_{AGR} = \eta_F - L_{SR}$$

$$m'_{AGR} = \frac{r_{AGR} \cdot m_K \cdot \lambda_A \cdot f_S}{1 - r_{AGR}}$$

Figure 4:
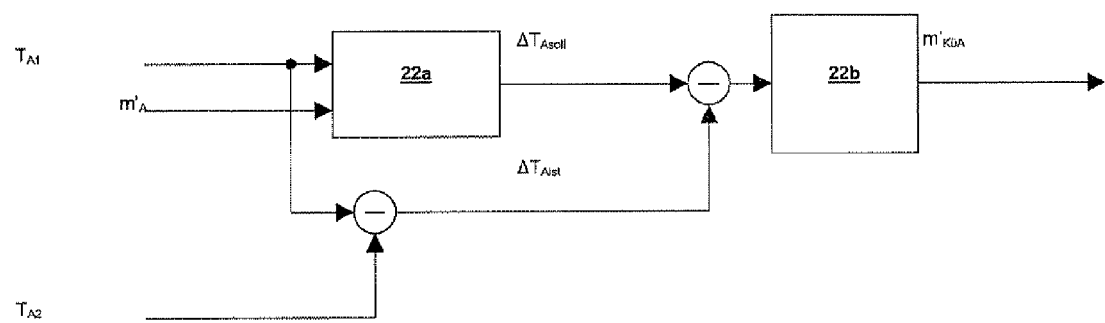
FIG. 4 illustrates the calculation of the overheating correction of the working medium mass flow involving the exhaust gas evaporator.
Figure 10:
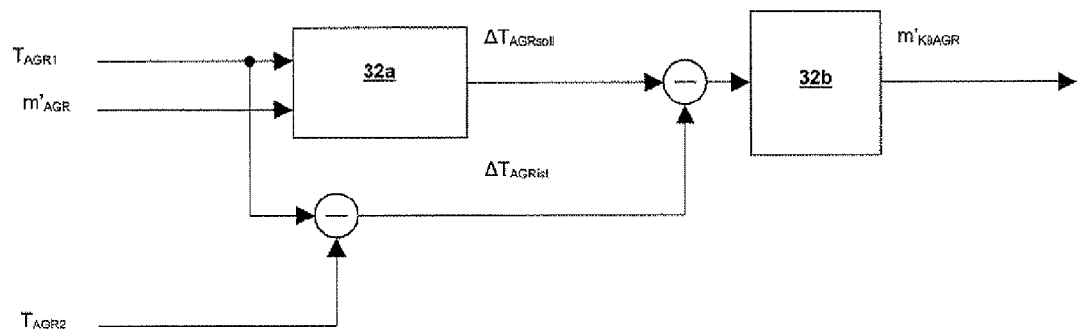
FIG. 10 illustrates the calculation of the overheating correction of the working medium mass flow involving the EGR evaporator.

Furthermore, the exhaust gas evaporator 2 and the EGR evaporator 3 each calculate in Step 22 or 32 respectively an overheating correction m'KüA, m'KüAGR for the working medium mass flow (FIGS. 4 and 10). The overheating correction m'KüA, m'KüAGR is executed to set the working medium temperature at the outlet of the exhaust gas evaporator 2 and the EGR evaporator 3 to the desired value in each case respectively.

In order to do this, it uses the effect that the working medium temperature TMA2, TMAGR2 at the outlet of an evaporator 2, 3 is coupled to the temperature difference on the gas side ΔTA=ΔTA1−ΔTA2, ΔTAGR=ΔTAGR1−

Figure 14:
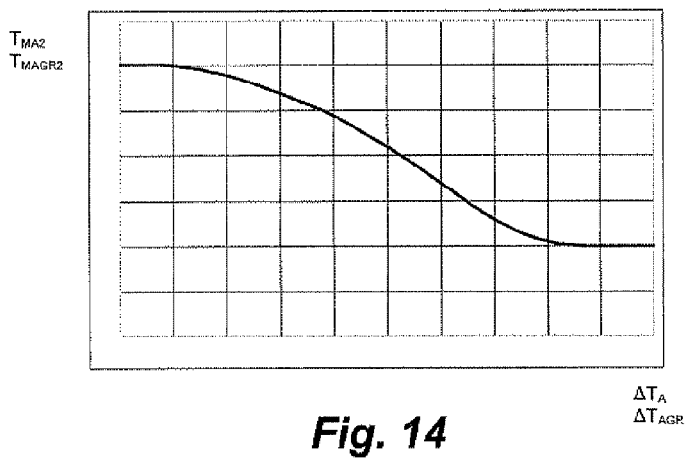
FIG. 14 illustrates the working medium temperature as a function of the temperature difference on the gas side.

ΔTAGR2 via the last evaporator block 2*a*, 3*a* (FIG. 1). This effect is illustrated by way of example in FIG. 14. Calculating the overheating correction m'KüA, m'KüAGR involves generating a setpoint value ΔTAsoll, ΔTAGRsoll for the desired temperature difference on the gas side at the EGR and exhaust gas evaporator.

This setpoint value ΔTAsol for the temperature difference is calculated for the exhaust gas evaporator 2 in Step 22*a* as a function of the exhaust gas mass flow m'A and the exhaust gas temperature TA1 at the exhaust gas evaporator inlet. A characteristic map is used for this purpose in the embodiment illustrated (FIG. 4).

The setpoint value ΔTAGRsoll for the temperature difference for the EGR evaporator 3 is calculated in Step 32*a* as a function of the EGR mass flow m'AGR and the gas temperature TAGR1 at the EGR evaporator inlet. A characteristic map is used for this purpose in the embodiment illustrated (FIG. 10).

The current actual value of the temperature differences ΔTAist, ΔTAGRist is calculated in each case from the temperatures TA1, TAGR1 at the evaporator inlets and the temperatures TA2, TAGR2 after the first evaporator block 2*c*, 3*c*. In addition, a controller deviation is generated for the exhaust gas evaporator and the EGR evaporator 2, 3 respectively from the setpoint values ΔTAsoll, ΔTAGRsoll and the actual values ΔTAist, ΔTAGRist. This controller deviation is supplied in Steps 22*b* and 32*b* respectively to a temperature controller (for instance, PID controller). The output of this temperature controller is the overheating correction m'KüA, m'KüAGR for the exhaust gas evaporator and the EGR evaporator 2, 3.

Figure 5:
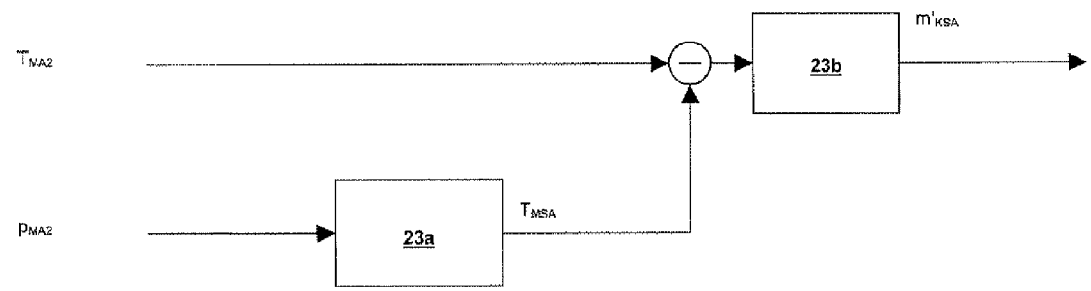
FIG. 5 illustrates the calculation of the saturation correction of the working medium mass flow involving the exhaust gas evaporator.
Figure 11:
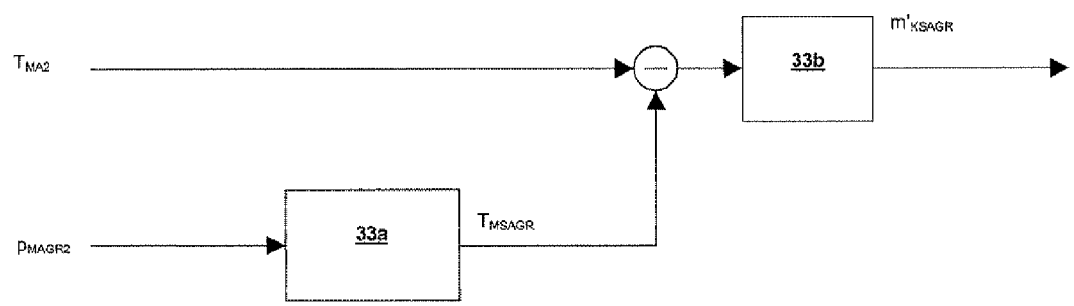
FIG. 11 illustrates the calculation of the saturation correction of the working medium mass flow involving the EGR evaporator.

Furthermore, the exhaust gas evaporator 2 and the EGR evaporator 3 each calculate in Steps 23 and 33 respectively a saturation correction m'KSA, m'KSAGR for the working medium mass flow (FIG. 5 and FIG. 11). The saturation correction m'KSA, m'KSAGR is executed in order to keep the working medium temperature TMA2, TMAGR2 at the outlet of the exhaust gas evaporator 2 and EGR evaporator 3, reliably above the saturated steam temperatures TMSA and TMSAGR.

Figure 15:
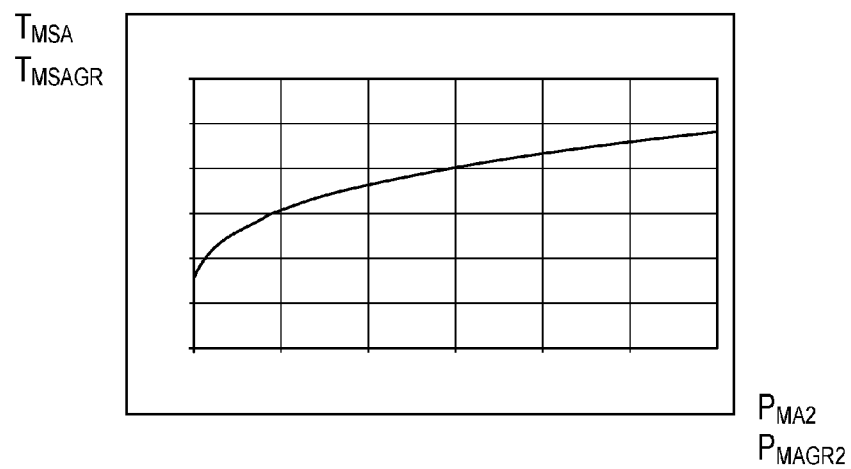
FIG. 15 illustrates by way of example the saturation temperature as a function of the pressure with ethanol as the working medium.

This involves calculating each saturated steam temperature TMSA and TMSAGR as a function of the working medium pressures pMA2, pMAGR2 at the evaporator outlets initially in Steps 23*a* or 33*a* respectively (for instance, ethanol in FIG. 15). The differences are generated from the actual working medium temperatures TMA2, TMAGR2 at the evaporator outlets and the measured saturated steam temperatures TMSA and TMSAGR and supplied to a correction function in Step 23*b*, 33*b* (for example correction characteristic curves).

The result of these correction functions is the saturation correction m'KSA, m'KSAGR of the working medium mass flows for the exhaust gas evaporator 2 and the EGR evaporator 3.

Figure 6:
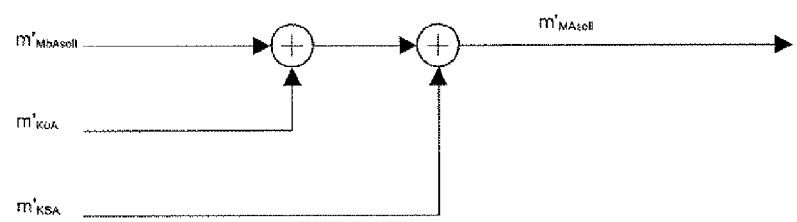
FIG. 6 illustrates the calculation of the setpoint value of the working medium mass flow involving the exhaust gas evaporator.
Figure 12:
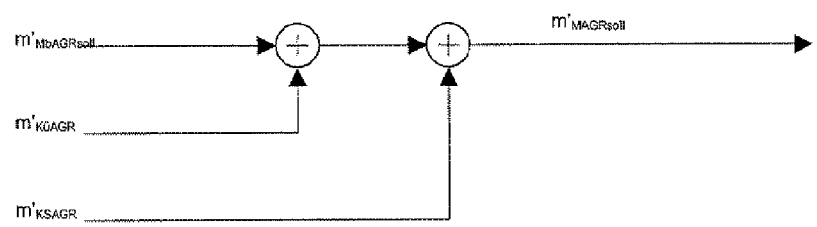
FIG. 12 illustrates the calculation of the setpoint value of the working medium mass flow involving the EGR evaporator.

Furthermore, the final setpoint value for the working medium mass flow m'MAsoll, m'MAGRsoll is calculated from the base setpoint value m'MbAsoll, m'MbAGRsoll, the overheating correction m'KüA, m'KüAGR and the saturation correction m'KSA, m'KSAGR in Step 24 and 34 respectively. This calculation is performed by adding the base setpoint value m'MbAsoll, m'MbAGRsoll, overheating correction m'KüA, m'KüAGR and saturation correction m'KSA, m'KSAGR (FIGS. 6 and 12). As a result, the setpoint value of the working medium mass flow m'MAsoll, m'MAGRsoll is now available from the exhaust gas evaporator 2 and the EGR evaporator 3.

Figure 7:
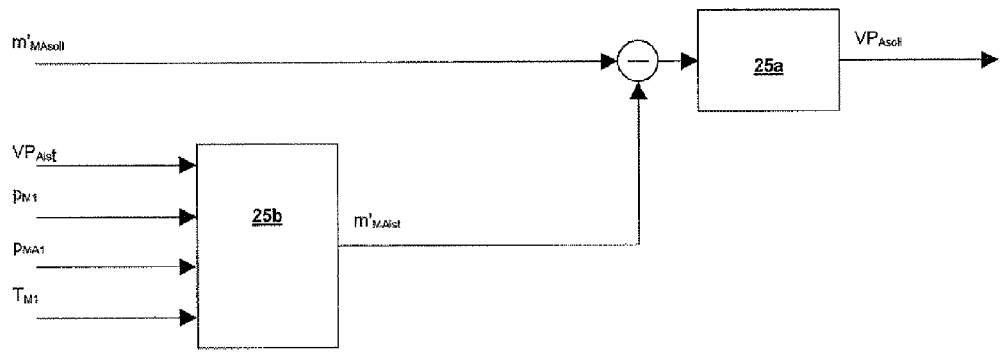
FIG. 7 illustrates the control of the working medium mass flow involving the exhaust gas evaporator.
Figure 13:
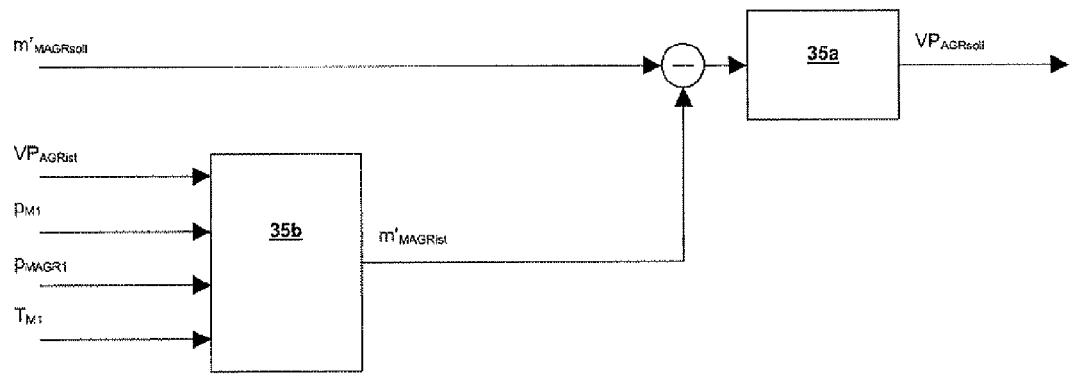
FIG. 13 illustrates the control of the working medium mass flow involving the EGR evaporator.

The controller deviations of the mass flows at the exhaust gas evaporator 2 and EGR evaporator 3 are generated from these setpoint values m'MAsoll, m'MAGRsoll and the current actual values m'MAist, m'MAGRist of the working medium mass flow and supplied to a controller 25*a*, 35*a* (for example PID controller). The setpoint positions VPAsoll, VPAGRsoll of the control valves 8, 9 are calculated in Step 25*a* and 35*b* (FIGS. 7 and 13).

Figure 16:
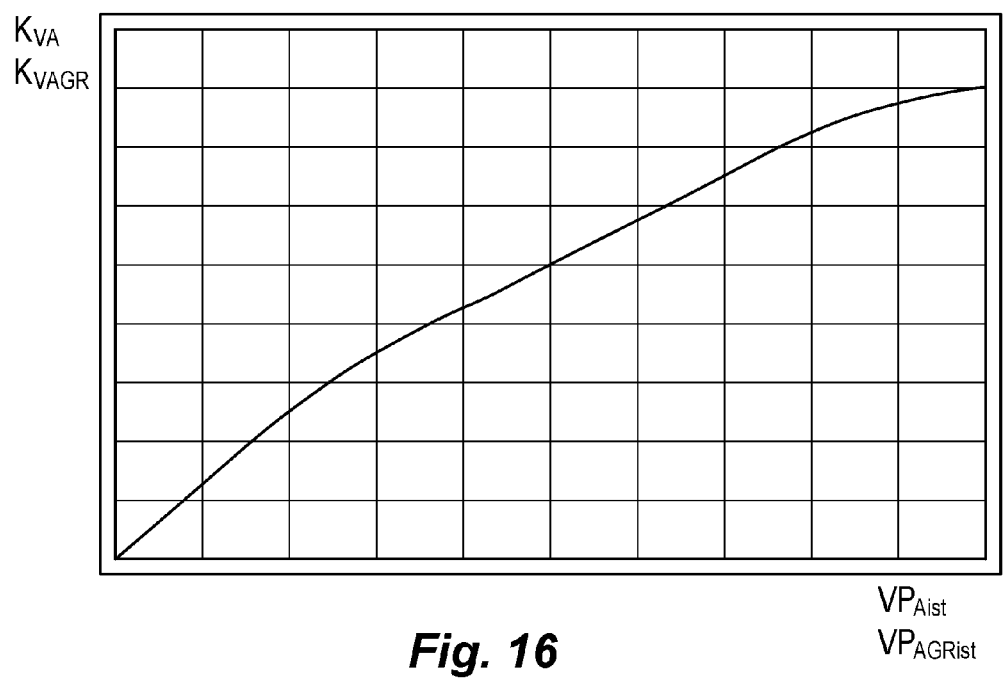
FIG. 16 illustrates a characteristic curve for the flow coefficients for the control valves.

The actual values m'MAist, m'MAGRist of the mass flows are calculated in Step 25 and 35 respectively as a function of the actual positions VPAist, VPAGRist of the control valves 8, 9, the pressures pM1; pMA1, pMAGR1) upstream and downstream from the control valves 8, 9 and the flow coefficients KVA, KVAGR of the control valves 8,9 using a model 25*b* and 35*b* respectively. The flow coefficients KVA, KVAGR of the control valves 8, 9 are calculated as a function of the actual positions VPAist, VPAGRist (for instance, stored in a characteristic curve FIG. 16).

$$m'_{MAist} = \sqrt{\frac{(p_{M1} - p_{MA1}) \cdot 1000}{\rho_M}} \cdot K_{VA}$$

$$K_{VA} = f(VP_{Aist})$$

$$m'_{MAGRist} = \sqrt{\frac{(p_{M1} - p_{MAGR1}) \cdot 1000}{\rho_M}} \cdot K_{VAGR}$$

$$K_{VAGR} = f(VP_{AGRist})$$

The outputs of the two mass flow controllers specify a setpoint position for the control valves 8, 9 respectively upstream of the respective evaporators 2, 3.

LIST OF REFERENCE NUMERALS, ABBREVIATIONS AND SYMBOLS

Heat recovery device
Exhaust gas evaporator
EGR evaporator
Expansion machine
Condensor
Expansion tank
Feed pump
Control valve for working medium upstream of exhaust gas evaporator
Control valve for working medium upstream of EGC evaporator
Internal combustion engine
20, 20*a*, 21, 22, 22*a*, 22*b*, 23, 23*a*, 23*b*, 24, 25 Steps
30, 30*a*, 31, 32, 32*a*, 32*b*, 33, 33*a*, 33*b*, 34, 35 Steps
22*b*, 32*b* ΔT controller
25*a*, 35*a* Mass flow controller
21, 25*b*, 31, 35*b* Model
n Motor speed
M Motor torque
mK Fuel mass
pL Absolute charge pressure
TL Charge temperature
TA1 Exhaust gas temperature upstream of exhaust gas evaporator
TA2 Exhaust gas temperature in exhaust gas evaporator
ΔTAsoll Setpoint value for the temperature difference in the exhaust gas evaporator
ΔTAist Actual value for the temperature difference in the exhaust gas evaporator TAGR1 Exhaust gas temperature upstream of EGR evaporator
TAGR2 Exhaust gas temperature in EGR evaporator
ΔTAGRsoll Setpoint value for the temperature difference in the EGR evaporator
ΔTAGRist Actual value for the temperature difference in the EGR evaporator
TMSA Saturation temperature of the working medium downstream from exhaust gas evaporator
T MSAGR Saturation temperature of the working medium downstream from EGR evaporator
T MA2 Temperature of the working medium downstream from exhaust gas evaporator
T MAGR2 Temperature of the working medium downstream from EGR evaporator
pM1 Pressure of the working medium upstream of the control valves
pMA1 Pressure of the working medium downstream from control valve of the exhaust gas evaporator
pMA2 Pressure of the working medium downstream from exhaust gas evaporator
pMAGR1 Pressure of the working medium downstream from control valve of the EGR evaporator
pMAGR2 Pressure of the working medium downstream from EGR evaporator
VPAist Actual position of the control valve of the exhaust gas evaporator
VPAsoll Setpoint position of the control valve of the exhaust gas evaporator
VPAGRist Actual position of the control valve of the EGR evaporator
VPAGRsoll Setpoint position of the control valve of the EGR evaporator
KVA Flow coefficient of the control valve of the exhaust gas evaporator
KVAGR Flow coefficient of the control valve of the EGR evaporator
pM Density of the working medium upstream of the control valves
λA Air ratio of the exhaust gas from the internal combustion engine
RSR Gas constant in the inlet pipe of the internal combustion engine
fS Stoichiometric air requirement of the internal combustion engine
ηF Admission efficiency of the internal combustion engine
ρSR Density in the inlet pipe of the internal combustion engine
LSR Volumetric efficiency relative to the state in the inlet pipe of the internal combustion engine
VH Displacement of the internal combustion engine
m'A Exhaust gas mass flow of the internal combustion engine
m'MAsoll Setpoint value of the working medium mass flow from the exhaust gas evaporator
m'MAist Actual value of the working medium mass flow from the exhaust gas evaporator
m'MbAsoll Base setpoint value of the working medium mass flow from the exhaust gas evaporator
m'KüA Overheating correction for exhaust gas evaporator
m'KSA Saturation correction for exhaust gas evaporator
m'AGR EGR mass flow
m'MAGRsoll Setpoint value of the working medium mass flow from the EGR evaporator
m'MAGRist Actual value of the working medium mass flow from the EGR evaporator
m'MbAGRsoll Base setpoint value of the working medium mass flow from the EGR evaporator
m'KüAGR Overheating correction for EGR evaporator
m'KSAGR Saturation correction for EGR evaporator

What is claimed is:

1. A method for controlling a heat recovery device in an internal combustion engine, the method comprising:
providing, for the heat recovery device, a circuit for a working medium having an evaporator of an expansion machine arranged in an exhaust gas flow path of the internal combustion engine, a condensor, an expansion tank, and a feed pump;
controlling, via a control unit, a working temperature of the working medium by varying a mass flow of the working medium as a function of at least one operating parameter;
calculating, via the control unit, a first setpoint value of the working medium mass flow of an exhaust gas flow path of an exhaust gas tract and/or an exhaust gas recirculation line on a basis of a base setpoint value for the working medium mass flow, wherein the base setpoint value is at least a function of an exhaust gas temperature and an exhaust gas mass flow in the exhaust gas flow path; and then
adding, via the control unit, at least one correction value to the base setpoint value.

2. The method of claim 1, further comprising adding, via the control unit, an overheating correction value to the base setpoint value.

3. The method of claim 2, further comprising deriving, via the control unit, the overheating correction value from a temperature difference between a first exhaust gas temperature upstream from the evaporator and a second exhaust gas temperature in the evaporator.

4. The method of claim 1, further comprising adding, via the control unit, a saturation correction value to the base setpoint value.

5. The method of claim 4, further comprising deriving, via the control unit, the saturation correction value from a saturation temperature dependent upon a working medium pressure downstream from the evaporator.

6. The method of claim 1, further comprising calculating, via the control unit, the exhaust gas mass flow in the exhaust gas tract using the air ratio of the exhaust gas and the fuel mass.

7. The method of claim 1, further comprising calculating, via the control unit, an EGR mass flow in the exhaust gas recirculation line using a motor speed, a motor torque, a fuel mass, an exhaust gas air ratio, an absolute charging pressure, a charge air temperature and an admission efficiency.

8. The method of claim 1, further comprising calculating, via the control unit, an actual working medium mass flow by the evaporator using an actual valve position, a first pressure upstream from the control valve of the evaporator, a second pressure downstream from the control valve of the evaporator, and a flow coefficient of the control valve.

9. The method of claim 1, further comprising generating, via the control unit, controller deviations for mass flows in the exhaust gas flow path from the setpoint values and actual values for the working medium flow.

10. The method of claim 9, further comprising supplying, via the control unit, the controller deviations to a controller.

11. The method of claim 1, wherein the internal combustion engine is arranged in a motor vehicle.

12. The method of claim 1, wherein the base setpoint value is at least a function of the exhaust gas temperature upstream of the evaporator.

13. A method for operating an internal combustion engine, the method comprising:
- providing a heat recovery device with a circuit for a working medium having an evaporator of an expansion machine arranged in an exhaust gas flow path of the internal combustion engine, a condensor, an expansion tank, and a feed pump;
- varying, via a control unit, a mass flow of the working medium as a function of at least one operating parameter to thereby control a working temperature of the working medium;
- calculating, via the control unit, a first setpoint value of the mass flow of the working medium in an exhaust gas flow path of an exhaust gas tract and/or an exhaust gas recirculation line of the internal combustion engine on a basis of a base setpoint value for the mass flow of the working medium, wherein the base setpoint value is at least a function of an exhaust gas temperature and a mass flow of an exhaust gas in the exhaust gas flow path; and then
- adding, via the control unit, at least one correction value to the base setpoint value.

14. A method for operating an internal combustion engine, the method comprising:
- controlling, via a control unit, a working temperature of a working medium in a heat recovery device of the internal combustion engine by varying a mass flow of the working medium as a function of at least one operating parameter;
- calculating, via the control unit, a first setpoint value of the mass flow of the working medium in an exhaust gas flow path of an exhaust gas tract and/or an exhaust gas recirculation line of the internal combustion engine on a basis of a base setpoint value for the mass flow of the working medium, wherein the base setpoint value is at least a function of an exhaust gas temperature and a mass flow of an exhaust gas in the exhaust gas flow path; and then
- adding, via the control unit, at least one correction value to the base setpoint value.

* * * * *